United States Patent [19]

Tani et al.

[11] 4,192,609

[45] Mar. 11, 1980

[54] METHOD FOR EFFECTING REGISTRATION FOR A COPYING APPARATUS

[75] Inventors: Tatsuo Tani, Tokyo; Masao Kono, Yokohama, both of Japan

[73] Assignee: Ricoh Co., Ltd., Japan

[21] Appl. No.: 886,355

[22] Filed: Mar. 14, 1978

[30] Foreign Application Priority Data

| | | | |
|---|---|---|---|
| Mar. 18, 1977 | [JP] | Japan | 52-29337 |
| Mar. 22, 1977 | [JP] | Japan | 52-30483 |
| Apr. 20, 1977 | [JP] | Japan | 52-44539 |
| Apr. 22, 1977 | [JP] | Japan | 52-45871 |

[51] Int. Cl.[2] ........ G03B 27/32; G03G 15/28

[52] U.S. Cl. ........ 355/77; 355/3 SH; 355/8; 355/57

[58] Field of Search ........ 355/3 R, 3 SH, 8, 14, 355/77, 132, 133, 57

[56] References Cited

U.S. PATENT DOCUMENTS

| | | | |
|---|---|---|---|
| 3,834,805 | 9/1974 | Pichierri | 355/14 X |
| 4,009,957 | 3/1977 | Suzuki et al. | 355/14 |
| 4,026,647 | 5/1977 | Kanno et al. | 355/14 X |
| 4,033,692 | 7/1977 | O'Connell | 355/3 R X |

*Primary Examiner*—Fred L. Braun
*Attorney, Agent, or Firm*—McGlew and Tuttle

[57] ABSTRACT

The copying apparatus has a magnification ratio varying device, and a photosensitive member, in motion, is exposed to an optical image of an original, by slit exposing, to form an electrostatic latent image thereon. The scanning velocity of the original is effected in accordance with the selected magnification ratio. Registration of the forward or leading end of the image of an original with the leading end of a photosensitive sheet or a transfer-printing sheet is effected by delivering a copy sheet, such as a photosensitive sheet or a transfer-printing sheet, to the photosensitive member only after the lapse of a predetermined period of time following production of a detection signal by a detection device cooperable with the leading edge of the original. The predetermined period of time is varied in conformity to the selected magnification ratio.

4 Claims, 15 Drawing Figures

METHOD FOR EFFECTING REGISTRATION FOR A COPYING APPARATUS

BACKGROUND OF THE INVENTION

This invention relates to a method for effecting registration for a copying apparatus having a magnification ratio varying device, wherein a photosensitive member in motion is exposed to an optical image of an original by slit exposing to form an electrostatic latent image thereon, by varying the original scanning velocity in accordance with the magnification ratio selected.

Nowadays electrophotographic copying apparatus equipped with magnification ratio varying devices are becoming popular. The term "magnification ratio" as used herein refers to the ratio of the size of a duplicate produced from an original by electrophotographic copying to that of the original. For example, when the magnification ratio is $1:\sqrt{2}$ a duplicate will have a size which is twice as large as that of its original; when it is 1:1, a duplicate will be equal in size to its original; and when it is $1:\sqrt{\frac{1}{2}}$ a duplicate will have a size which is one half as large as that of its original. In copying apparatus of the aforementioned type, it is necessary to effect registration of the forward end of the image of an original which is projected by a light on the photosensitive member or of the image of an original, formed on the photosensitive member, with the leading end of a photosensitive sheet or a transfer-printing sheet which is in motion, when copying of the original is carried out. Particularly when restriction is placed on the position in which an electrostatic latent image is formed on the photosensitive member, such as when the photosensitive member is in drum form and has wound on its periphery a photosensitive sheet which has a gap, it is essential that copying be performed by synchronizing the movement of the photosensitive member with the operation of exposing the photosensitive member to an optical image of an original and by bringing the forward end of an image formed on the photosensitive member into registration with the leading end of a transfer-printing sheet which is delivered to the transfer-printing position, in the case where a copying apparatus of the aforesaid type having a magnification ratio varying device is used. A change in the magnification ratio by means of a magnification ratio varying device makes it necessary to change the travelling speed of the photosensitive member or the original scanning speed. However, the structural arrangement of a copying apparatus makes it difficult to change the speed at which the photosensitive member travels. Thus it is usual practice to change the original scanning speed in accordance with a change in the magnification ratio.

A change in the original scanning speed which is necessitated by a change in the magnification ratio may cause mismatching in place of the forward end of the image of an original on the photosensitive member and the leading end of a copy sheet.

SUMMARY OF THE INVENTION

This invention has as its object the provision of a method for effecting registration which enables the magnification ratio to be varied without causing the aforementioned mismatching in producing a copy from an original by means of electrophotographic copying.

The aforementioned object is accomplished by the steps of providing first detection means for detecting the leading end of the original in a path of travel of the original or a path of travel of a movable optical system, and delivering a copy sheet after the lapse of a predetermined period of time following the production of a detection signal by the first detection means, the predetermined period of time being varied in conformity with the selected one of the magnification ratios. Other features and advantages of the invention will become apparent from the following description of embodiments of the invention, together with the accompanying drawings.

BRIEF DESCRIPTION OF THE DRAWINGS

The problems encountered with regard to changing the magnification ratio and embodiments of the invention which provide a solution to each of these problems will now be described by referring to the accompanying drawings, in which.

DESCRIPTION OF THE PREFERRED EMBODIMENTS

Figure 1:
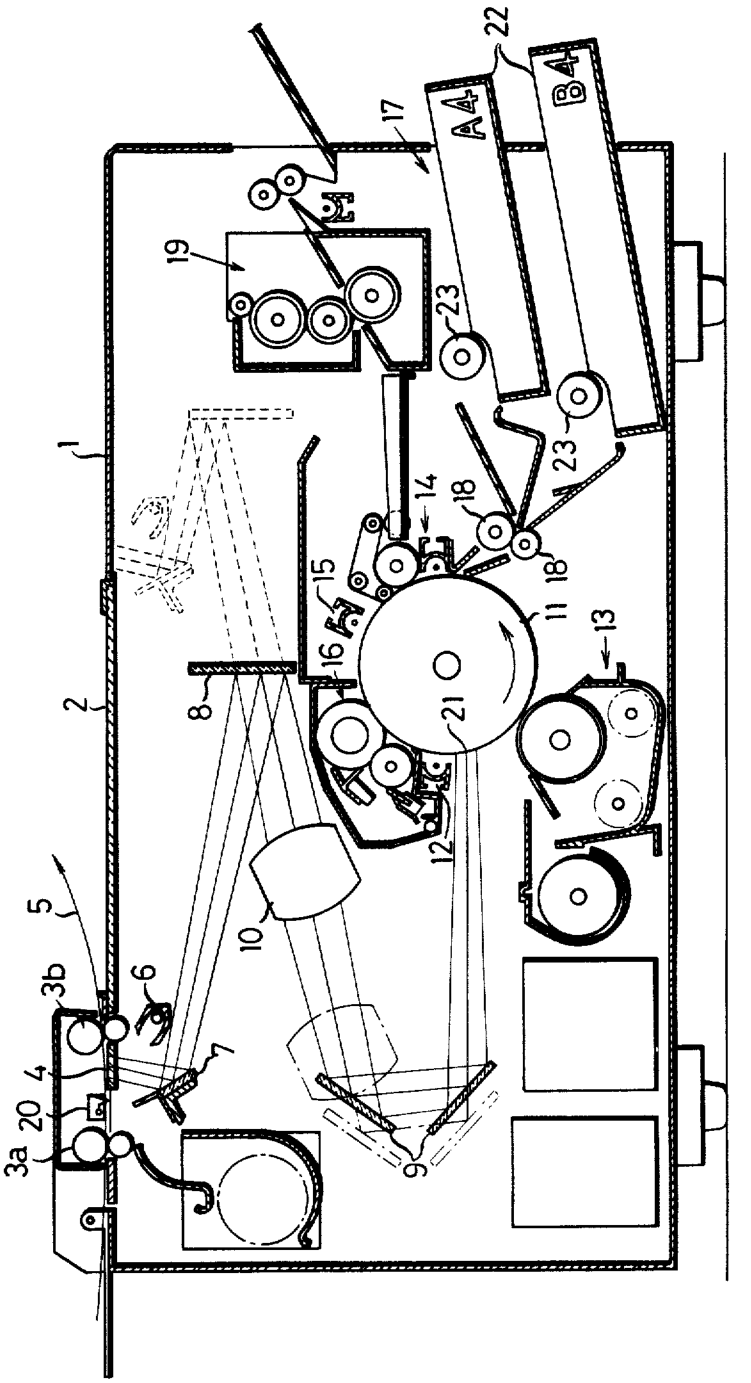
FIG. 1 is a schematic partially sectional view of a copying apparatus which is suitable for carrying out the method according to the present invention into practice.

Preferred embodiments of the invention will now be described by referring to the accompanying drawings. In FIG. 1, there is shown an electrophotographic copying apparatus comprising a casing 1, a large thickness original or a book type original placing transparent glass plate 2 in a top wall of the casing 1, small thickness original or sheet original feed means 3a, 3b in the top wall of the casing 1, and an original exposing slit 4 mounted in the sheet original feed means 3a, 3b. In this apparatus, a sheet original 5 is fed either manually or by means of an automatic original feed device (not shown) in the direction of an arrow. Mounted within the casing 1 is an exposing device comprising a light source 6, mirrors 7, 8 and 9 and a lens system 10. When a large thickness original is placed on the original placing glass plate and copied, the light source 6 and mirrors 7 and 8 are moved to scan the original. The lens system 10 and mirror 9 can be moved between their solid line positions and dash-and-dot line positions for changing the magnification ratio.

A photosensitive drum 11 is mounted within the casing 1 for rotation in the direction of an arrow, and an electrically charging device 12, an exposing position 21, a developing device 13, a transferprinting device 14, an electric charge removing device 15 and a cleaning device 16 are located around the photosensitive drum 11, as it well known. There are also provided a sheet feed device 17, a pair of register rollers 18 and a fixing device 19. The sheet feed device 17 includes two cassettes 22, 22 for placing therein sheets of two different sizes. A sheet feed roller 23 is mounted above each cassette 22. These devices are known and their detailed constructions will not be described herein.

The aforementioned copying apparatus includes a detection switch 20 for detecting the leading end of an original, and which is located in the path of travel of the original. Difficulties are encountered in mounting the detection switch 20 in the original exposing slit 4. In view of the need to produce a feed signal for a transfer-printing sheet or a photosensitive sheet and control signals for various copying operations in good timing with respect to the detection of the original, the detection switch 20 is mounted anterior to the exposing slit 4. This arrangement is shown in detail in FIG. 2.

Figure 2:
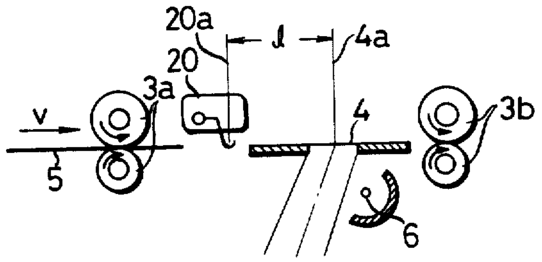
FIG. 2 is a schematic sectional view showing the width of the slit for exposing a sheet original.

In FIG. 2, the sheet original 5 fed by means of the pair of feed rollers 3a, 3b has its leading end detected by the detection switch 20, then is illuminated through the exposing slit 4 by means of a light emanating from the light source 6 and is finally discharged by means of the pair of feed rollers 3b, 3b. In this case, the velocity of travel of the original 5 at a standard magnification ratio $m_1$ (1:1, for example) is denoted by v, and the distance between a detecting position 20a of the detection switch 20 and a standard position 4a of the exposing slit 4 is denoted by l. The standard position 4a of the exposing slit 4 refers to the position of that light ray, of all the light rays in the light path connecting the original exposing slit 4 with a slit in an image forming section of a photosensitive member, whose position never changes and remains unchanged even if the lens and mirrors are moved and the slits show a change in their width, when the magnification ratio is varied. Assuming that it takes the original a time t to cover the distance l in its movement, the following relation holds:

$$t=l/v$$

If the magnification ratio $m_1$ is constant, the original travel velocity will be constant and there will be no change in the value of t. After a lapse of the time t following the detection of the leading end of the original 5 by the detection switch 20, the leading end of the original 5 is illuminated, and an electrostatic latent image is formed on the surface of the photosensitive drum 11 in the exposing position 21 through the slit in the image forming section. The electrostatic latent image is then developed by the developing device 13 into a visible image and travels to a transfer-printing position. At this time, a transfer-printing sheet fed from any one of the cassettes 22 by means of the associated feed roller 23 abuts against a nip of register rollers 18, 18, which remain stationary, and stands by. The register rollers 18, 18 begin rotating after the lapse of a predetermined period of time varied in accordance with the magnification ratio selected following the detection of the leading end of the original 5 by the detection switch 20, to deliver the transferprinting sheet for effecting registration so that the transfer-printing sheet is superposed on the visible image on the photosensitive drum 11 which has just reached the transfer-printing position. Thus the transfer-printing sheet having the visible image thereon passes the transfer-printing position. The predetermined period of time is selected such that the visible image on the photosensitive drum 11 and the transfer-printing sheet delivered by the register rollers 18, 18 are brought into registration with each other.

Figure 3:
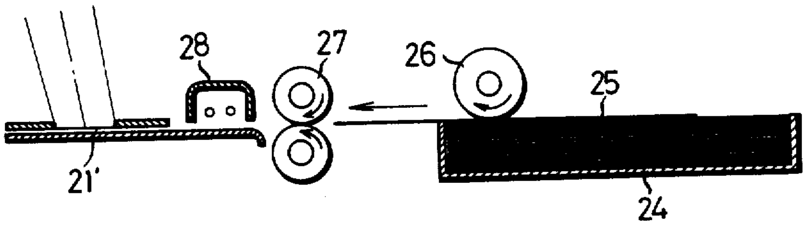
FIG. 3 is a schematic sectional view showing the width of the slit in the image forming section of a direct copying apparatus using photosensitive sheets.

In the direct-type copying apparatus shown in FIG. 3, a plurality of photosensitive sheets 25 are arranged in vertically stacked relation in a cassette 24, and the uppermost sheet is fed by means of a feed roller 26 and brought to a position in which it abuts against a nip of register rollers 27, 27 which remain stationary, so that the photosensitive sheet stands by. As aforesaid, the register rollers 27, 27 begin to rotate after the lapse of the predetermined period of time, varied in accordance with the magnification ratio selected, following the detection of the leading end of the original 5 by the detection switch 20, so that the photosensitive sheet standing by is delivered for effecting registration by the register rollers 27, 27 to a position in which it is electrically charged by an electrically charging device 28. Then, the photosensitive sheet reaches a slit 21' of the image forming section which is disposed in an exposing position, where the photosensitive sheet is exposed to an optical image of the original projected through the exposing slit 4 at this time, so that an electrostatic latent image is formed on the photosensitive sheet.

In the copying apparatus of the type described above, if the standard magnification ratio $m_1$ is varied while the feed velocity of the photosensitive sheet remains constant, the original travel velocity must be changed. The original travel velocity is distinctly determined by the selected magnification ratio. Assuming that the standard magnification ratio $m_1$ is varied to $m_2$ and $m_3$, the original travel velocity will change from v to the following:

$$\frac{m_1 v}{m_2}, \frac{m_1 v}{m_3}$$

Therefore, if the times required for the original to reach the standard position of the slit from the detected position are denoted by t1, t2 and t3 for the magnification ratios m1, m2 and, 3 respectively, the following relations hold:

$$t1 = \frac{l}{v} \quad (1)$$

$$t2 = \frac{m2}{m1} \cdot \frac{l}{v} \quad (2)$$

$$t3 = \frac{m3}{m1} \cdot \frac{l}{v} \quad (3)$$

Thus variations will occur as follows in the time required for achieving registration when the magnification ratio is changed:

$$t_1 - t_2 = \frac{l}{v} - \frac{m2}{m1} \cdot \frac{l}{v} = (1 - \frac{m2}{m1}) \frac{l}{v}$$

$$t_1 - t_3 = \frac{l}{v} - \frac{m3}{m1} \cdot \frac{l}{v} = (1 - \frac{m3}{m1}) \frac{l}{v}$$

Therefore, if a method is used whereby a photosensitive sheet or a transfer-printing sheet is delivered by the register rollers after the lapse of a fixed period of time following detection of the forward end of an original, it will be impossible to satisfactorily effect registration when the magnification ratio is changed. In this case, the velocity of travel of the photosensitive member will be $m_1v$ if the standard magnification ratio is assumed to be $m_1$, so that variations in position on the surface of the photosensitive member in effecting registration for the magnification ratios $m_2$ and $m_3$ will be as follows:

$$(1 - \frac{m2}{m1}) \frac{l}{v} \times m_1 v = (m_1 - m_2)l$$

$$(1 - \frac{m3}{m1}) \frac{l}{v} \times m_1 v = (m_1 - m_3)l$$

For example, if the standard magnification ratio $m_1=1$, $m_2=0.71$ (corresponding to the reduction of an original of an A3 size to produce a duplicate of an A4 size) and $l=20$ mm, the amount of variation in position will be as follows:

$$(1-0.71)\times 20=5.8 \text{ mm}$$

The present invention contemplates the provision of a method whereby the aforementioned problem encountered in effecting registration can be satisfactorily solved. The method consists in varying the interval of time between the production of a detection signal by the original forward end detection switch 20 and the production of a copy sheet delivery signal in accordance with the selected magnification ratio. More specifically, the aforementioned interval of time is set at a value which corresponds to the period of time required for the forward end of an original to reach the standard position of the slit following detection of the forward end of the original plus a fixed period of time so that registration can be achieved satisfactorily.

The interval of time between the production of a detection signal by the aforesaid original forward end detection means and the delivery of a copy sheet can be provided by using timers equal in number to the magnification ratios available and each having a time lag corresponding to the respective magnification ratio. One of such timers is selected in accordance with the magnification ratio and the selected timer is actuated after the forward end of an original is detected. An output of the timer is used to actuate a delivery roller rotating signal timer whose output is used as a delivery roller rotating signal. Alternatively, the aforementioned interval of time can be provided by using a timer whose time lag can be varied in accordance with the selected magnification ratio and selecting a suitable time lag in conformity with the magnification ratio. Two other examples will hereinafter be described by referring to FIGS. 4 and 5.

Figure 4:
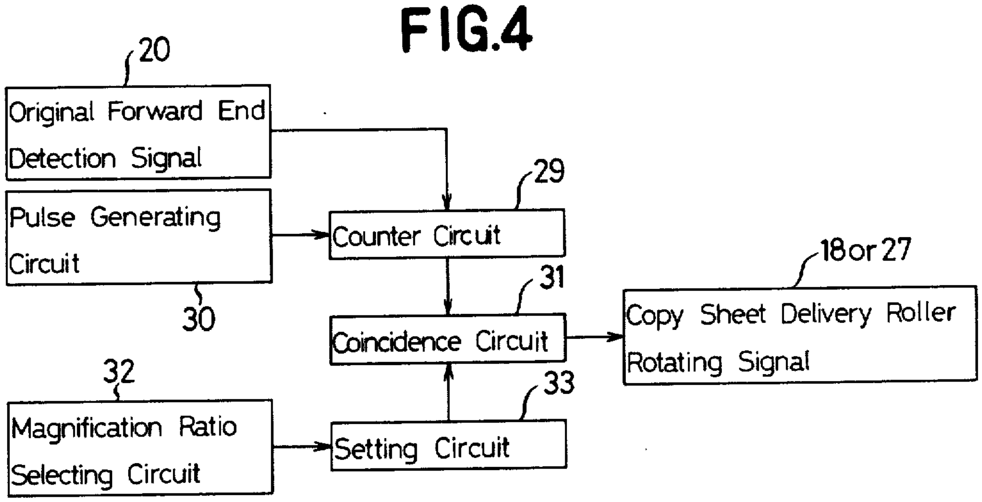
FIG. 4 is a block diagram showing a digital control circuit for changing the predetermined period of time.

In FIG. 4, when the forward end of an original is detected by the detection switch 20, a counter circuit 29 is actuated by a detection signal produced by the detection switch 20. The counter circuit 29, to which pulses are supplied by a pulse generating circuit 30 at all times, starts counting the number of pulses when it is actuated. The number of pulses thus counted is supplied to a coincidence circuit 31 to which the number of pulses corresponding to the magnification ratio selected by the magnification ratio selecting circuit 32 and set by a setting circuit 33 has already been supplied. When the number of pulses successively supplied from the counter circuit 29 coincides with the number of pulses already supplied from the setting circuit 33, the coincidence circuit 31 produces a signal which energizes either the register rollers 18, 18 or 27, 27 to deliver a transfer-printing sheet or a photosensitive sheet.

Figure 5:
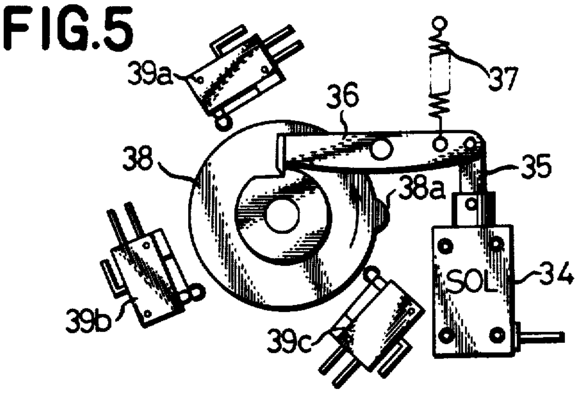
FIG. 5 is an elevation view of a cam mechanism for changing the predetermined period of time.

In FIG. 5, a solenoid 34 is energized by an original forward end detection signal from the detection switch 20. Energization of the solenoid 34 pulls a plunger 35 and causes a control lever 36 to pivot clockwise against the biasing force of a spring 37. This releases a single rotation clutch 38 from locking engagement with the control lever 36, so that the clutch 38 begins to rotate in the direction of the arrow. A cam projection **38*a* formed at the edge of the clutch 38 successively comes into contact with and actuates switches 39*a*, 39*b* and 39*c* arranged in positions corresponding to the respective magnification ratios. One of these switches 39*a*, 39*b* and 39*c* which corresponds to the magnification ratio selected by a magnification ratio selecting circuit is selected beforehand. If such switch is actuated by the cam projection 38*a*, the switch energizes a solenoid for either the register rollers 18, 18 or 27, 27**, so that a transfer-printing sheet or a photosensitive sheet standing by is delivered.

Figure 6:
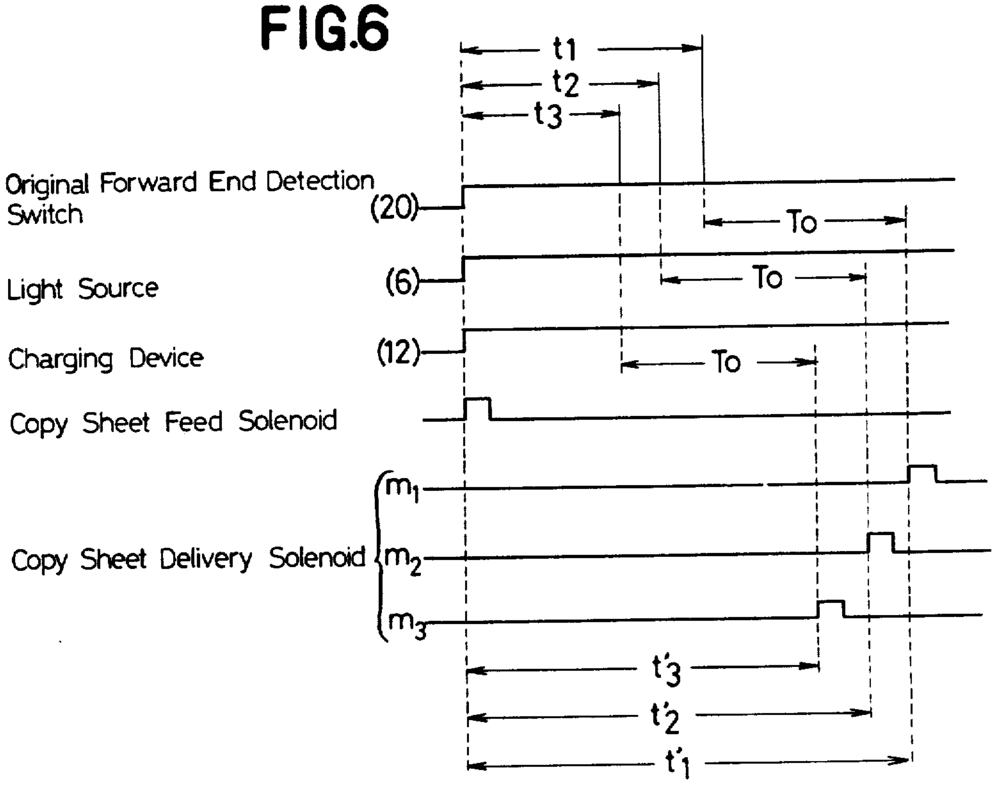
FIG. 6 is a time chart showing the operation of various devices and the production of signals taking place in chronological sequence when the first embodiment is carried into practice.

In FIG. 6, a current is passed to the light source 6 and the charging device 12 and a solenoid for one of the feed rollers 23, 23 is energized by an original forward end detection signal supplied by the detection switch 20 to feed one transfer-printing sheet. The transfer-printing sheet fed in this way abuts against the inoperative register rollers 18, 18 and stops, thereby remaining in a standby position. After lapse of one of the periods of time $t_1$, $t_2$ and $t_3$, shown in equations (1), (2) and (3) and depending on the selected magnification ratio, the forward end of the original reaches the standard position **4*a* of the exposing slit 4, and exposing of the surface of the photosensitive drum 11 to an optical image of the original is initiated. After the lapse of a fixed period of time $T_0$ following the passage of the original through the standard position 4*a*, a transfer-printing sheet delivery signal is supplied to the solenoid for the register rollers 18, 18** which start rotating and deliver the transfer-printing sheet in the standby position to the transferprinting position where the transfer-printing sheet is brought into registration with the image of the original on the photosensitive drum which reaches the transfer-printing position with good timing. Thus the image of the original is printed on the transfer-printing sheet from the photosensitive drum.

In the embodiment shown in FIG. 3, it is necessary that the photosensitive sheet 25 reach the standard position of the image forming slit when the forward end of an original reaches the standard position of the exposing slit.

As aforesaid, if the period of time between the passage of an original through the standard position of the slit and the production of a copy sheet delivery signal is denoted by $T_0$ and the periods of time between the detection of the original and the production of a delivery signal are denoted by $t_1'$, $t_2'$ and $t_3'$ for the magnification ratios $m_1$, $m_2$ and $m_3$ respectively, then the following relations hold:

$$t_1' = T_0 + t_1 = T_0 + \frac{l}{v} \quad (4)$$

$$t_2' = T_0 + t_2 = T_0 + \frac{m2l}{m1v} \quad (5)$$

$$t_3' = T_0 + t_3 = T_0 + \frac{m3l}{m1v} \quad (6)$$

Generally, the periods of time $t_1$, $t_2$ and $t_3$ are very short because the original detecting section is near to the exposing slit. Therefore, if the feeding and delivery of a copy sheet cannot be effected in time, the original has only to be stopped for a fixed period of time $t_s$ prior to its arrival at the exposing slit after being detected by the detection switch 20. When this is the case, the periods of time $t_1'$, $t_2'$ and $t_3'$ can be set by using the following equations:

$$t_1' = T_0 + \frac{l}{v} + t_s \quad (7)$$

$$t_2' = T_0 + \frac{m2l}{m1v} + t_s \quad (8)$$

$$t_3' = T_0 + \frac{m3l}{m1v} + t_s \quad (9)$$

The present invention can have application not only in copying apparatus of the aforementioned sheet original moving system but also in copying apparatus of the original support platform moving system and the optical system moving system. These applications will be described by referring to FIGS. 7 and 8.

Figure 7:
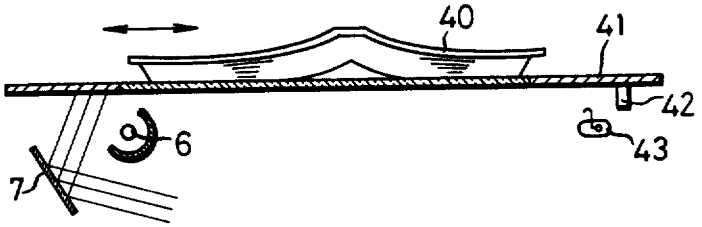
FIG. 7 is a schematic sectional view showing the application of the first embodiment in a copying apparatus of the type in which the original placing table is moved.

In FIG. 7, an original support platform 41 which moves with an original 40 thereon is formed with an actuating projection 42. An original forward end detection switch 43 adapted to cooperate with the actuating projection 42 is mounted in the path of travel of the original support platform 41. A detection signal produced by the detection switch 42 as it is actuated by the actuating projection 42 serves as the original forward end detection signal described with reference to FIG. 6, and a copy sheet delivery signal is produced after lapse of the period of time $t_1'$, $t_2'$ or $t_3'$ following the production of the detection signal by the detection switch 43.

Figure 8:
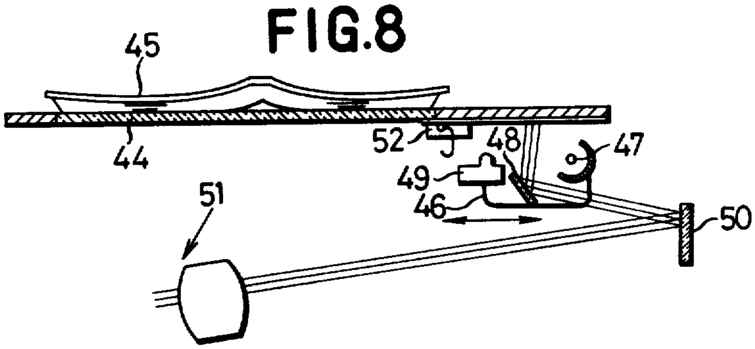
FIG. 8 is a schematic sectional view showing the application of the first embodiment in a copying apparatus of the type in which the optical system is moved.

In FIG. 8, a large thickness original 45 is placed on an original placing glass plate 44 and scanned by a movable optical system 46. The movable optical system 46 has mounted therein a light source 47, a mirror 48 and an actuating element 49. The optical system 46 further includes another mirror 50 which travels at a velocity which is one half the velocity of the movable optical system 46. 51 designates a magnification ratio varying optical system. A detection switch 52, which is adapted to be actuated by the actuating element 49 when the optical system 46 travels and to issue an original forward end detection signal, is mounted on the underside of a top wall of the casing supporting the original placing glass plate 44.

It will be appreciated that the method according to the invention ensures registration or matching in place of the forward end of the image of the original and the leading end of the copy sheet, even if the original scanning velocity changes when the magnification ratio is varied.

In the first embodiment described hereinabove, one detection means is relied on to effect lighting of the light source, passing of a current to the electrical charging device, and feeding and delivery of a copy sheet in good timing. Especially, the feeding of the copy sheet must be completed prior to initiation of the delivery thereof to the transfer-printing position or exposing position in such a manner that registration can be effected. To this end, the detection means must be located in the original travelling path in a position which is upstream of the original exposing slit by a considerable distance. An increase in the distance between the detection means and the exposing slit results in an increased possibility of occurrence of mismatching in place of the forward end of the image of an original projected on the photosensitive member or of the image of an original formed on the photosensitive member and the leading end of a photosensitive sheet or a transfer-printing sheet. This places burdens on the detection means and registration may not be effected with a high degree of precision. Registration can be effected with increased precision by using a second embodiment of the invention which will now be described.

Figure 9:
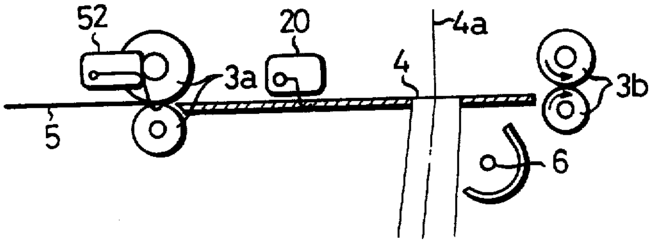
FIG. 9 is a schematic sectional view in explanation of a second embodiment of the method in conformity with the invention.
Figure 10:
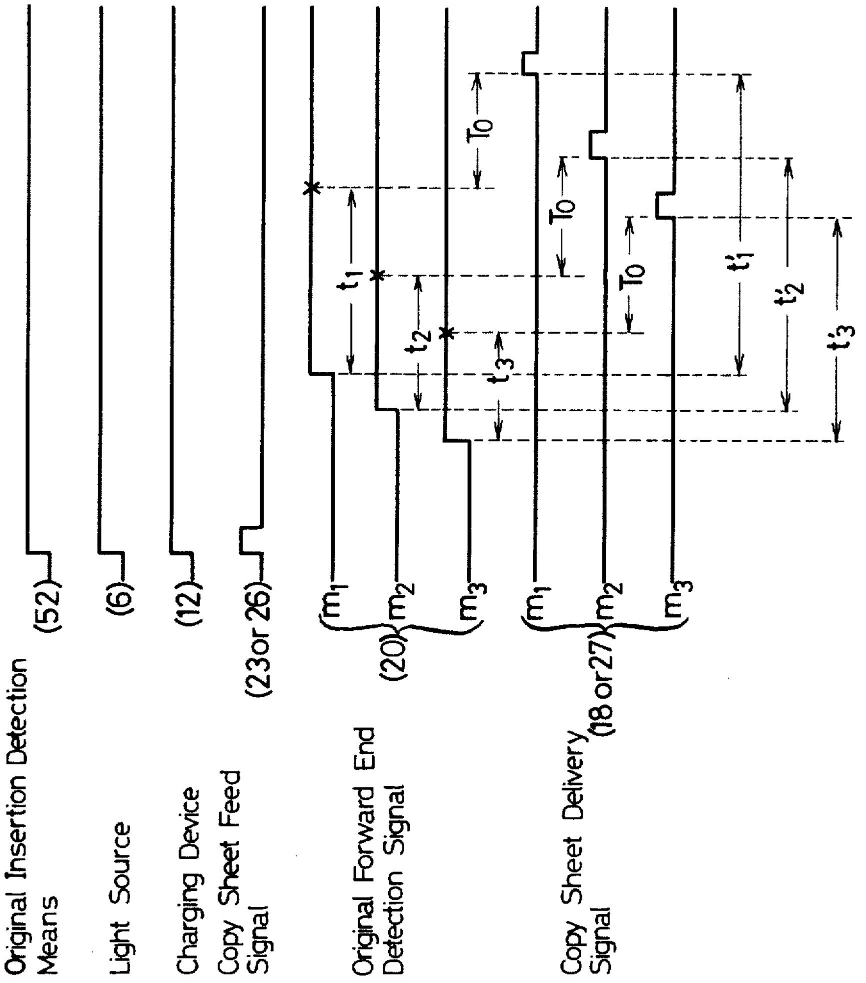
FIG. 10 is a time chart showing the operation of various devices and the production of signals taking place in chronological sequence when the second embodiment is carried into practice.

In FIG. 9, the original forward end detecting switch 20 (first detection switch) described with reference to the first embodiment is mounted in the path of travel of the original in a position upstream of the original exposing slit 4, and an original insertion detection switch 52 (second detection switch) is mounted upstream of the first detection switch. As shown in FIG. 10, lighting of the light source 6, passing of a current to the charging device 12, and rotating of the feed roller 23 of either one of the cassettes 22, 22 are effected by an original forward end detection signal produced by the second detection switch 52. The first detection switch 20 produces an original forward end detection signal, and after the lapse of a predetermined time which is in conformity with the selected magnification ratio, a copy sheet delivery signal is produced, with the result that the delivery rollers 18, 18 or 27, 27 begin to rotate and deliver the copy sheet in the standby position.

Figure 11:
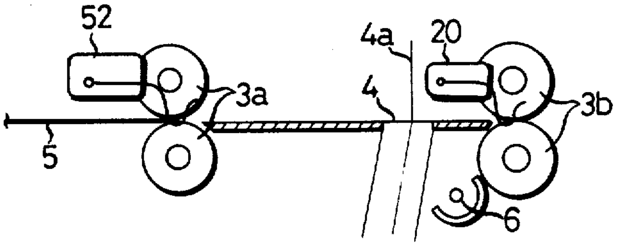
FIG. 11 is a schematic sectional view in explanation of a modification of the second embodiment.
Figure 12:
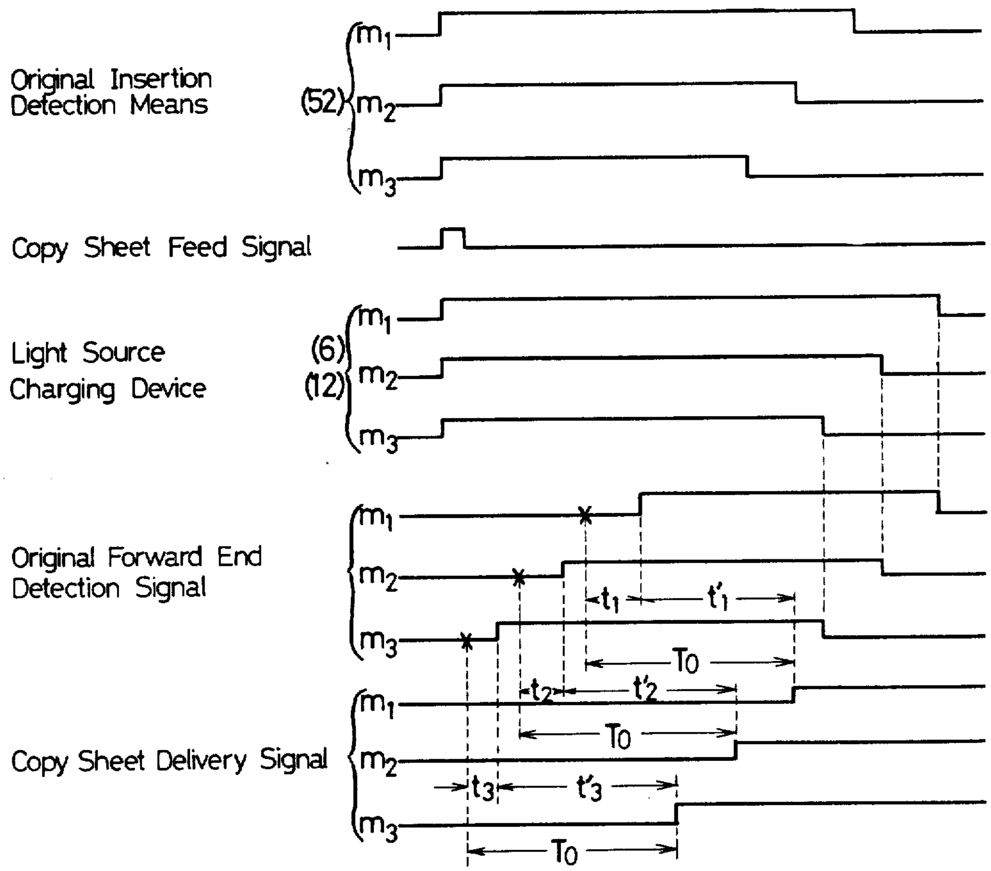
FIG. 12 is a time chart similar to that in FIG. 10 when a modification of the second embodiment shown in FIG. 11 is carried into practice.

As shown in FIG. 11, the original forward end detection switch 20 may be mounted downstream of the original exposing slit 4. When this is the case, the original forward end detection switch is actuated after the original 5 has passed through the standard position 4*a* of the slit 4. Therefore, the timing chart is as shown in FIG. 12. In FIG. 12, the symbol x indicates the exact time at which the forward end of an original passes through the standard position 4*a* of the slit 4. By setting the interval of time between the time x and the production of a copy sheet delivery signal at the fixed period of time $T_0$, it is possible to avoid the failure to effect registration. Thus the periods of time $t_1'$, $t_2'$ and $t_3'$ between the production of an original forward end detection signal and the production of a copy sheet delivery signal for the respective magnification rations have only to be set as follows:

$$t_1' = T_0 - t_1$$

$$t_2' = T_0 - t_2$$

$$t_3' = T_0 - t_3$$

In this example, it is possible to detect the rearward end of an original by the forward end detection means to put out the light source or stop the supply of a current to the charging device.

In the event that there is still an insufficiently long time between the feeding of a copy sheet and the delivery thereof even if the aforesaid process is adopted, the movement of the original may be temporarily interrupted after the insertion of the original is detected by the original insertion detection switch (second detection means). Any position may be selected for interrupting the travel of the original, so long as such position is anterior to the original leading end detection switch (first detection means) and the exposing slit. Since the interruption of the travel of the original occurs prior to the production of the original leading end detection signal by the original leading end detection switch (first detection means) which is used as a reference for the production of a copy sheet delivery signal, such interruption of the travel of the original causes no error in effecting registration.

Like the first embodiment, the aforementioned second embodiment can be advantageously carried into practice by using a copying apparatus of the original placing table moving system or of the optical system moving system.

Figure 13:
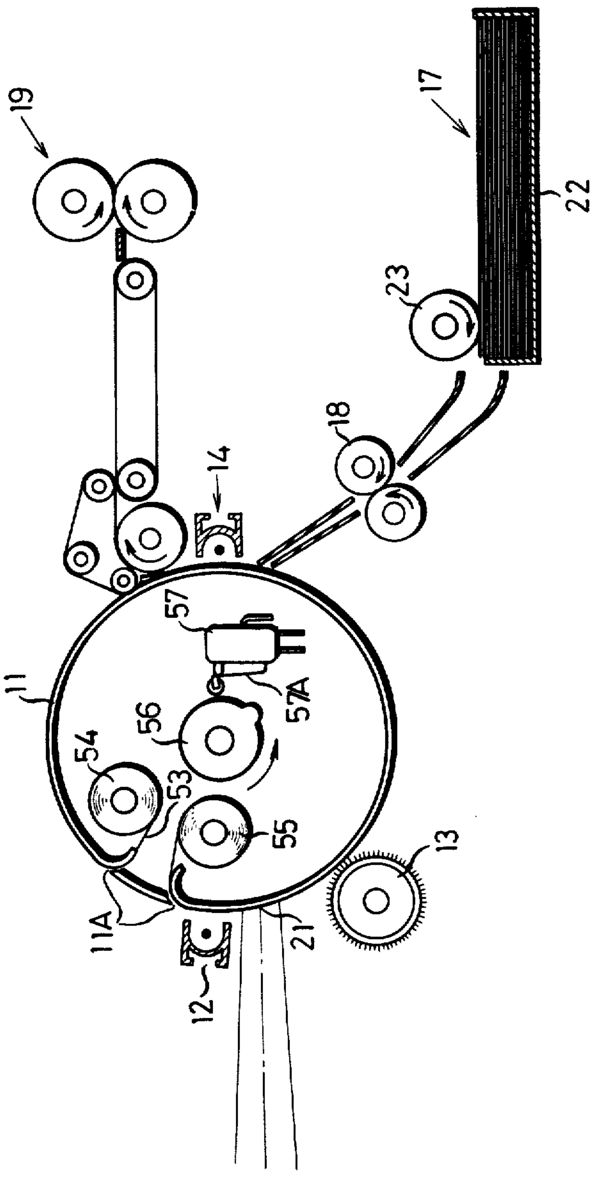
FIG. 13 is a fragmentary schematic partially sectional view of a copying apparatus including a photosensitive drum provided with a photosensitive strip having a gap in a portion thereof which is wound on the drum, and adapted to carry out a third embodiment of the method in conformity with the invention into a practice.

The present invention can have application in a copying apparatus having a photosensitive drum provided with a photosensitive strip having a gap in a portion thereof which is wound on the drum as shown in FIG. 13. A third embodiment of the invention will now be described.

In FIG. 13, a photosensitive strip 53 is wound on the outer periphery of the photosensitive drum 11 and extends, through a slit 11A formed longitudinally of the drum 11, into the interior of the drum 11 where both ends of the photosensitive strip 53 are wound on a take-up spool 54 and a pay-out spool 55 respectively. By paying out a required length of the photosensitive strip 53 from the pay-out spool 55 and winding the strip 53 on the take-up spool 54, it is possible to replace the old portion of the photosensitive strip 53 on the outer periphery of the photosensitive drum 11 by a new portion thereof. The photosensitive drum 11 is supported for rotation by a shaft which also supports a cam 56 having a projection in its periphery which is adapted to be contacted by an actuator 57A of a stationary detection switch 57. As the projection of the cam 56 is contacted by the actuator 57A having a roller, the slit 11A of the photosensitive drum 11 or the gap in the portion of the photosensitive strip 53 wound on the drum 11 can be detected.

In the copying apparatus including the aforementioned photosensitive drum 11, an original inserted in the original feed means *3a*, *3b* and fed thereby strikes the original leading end detecting switch 20 (first detection means) shown in FIG. 2, which produces a detection signal. The original is temporarily stopped after the lapse of a fixed period of time following the production of the detection signal anterior to the exposing operation and the exposing slit. Then the reference position (slit 11A) of the rotating drum 11 is detected by a detection switch 57 (third detection means) which produces a detection signal. After the lapse of a predetermined time following the production of the reference position detection signal, a transfer-printing sheet is delivered for registration. Meanwhile the original, which has been temporarily rendered stationary, is moved again after the lapse of another predetermined time following the production of the reference position detection signal so that an exposing operation can be carried out. Each of the aforementioned predetermined times includes zero, and this means that delivery of the transfer-printing sheet or restarting of the travel of the original may be effected simultaneously with the production of the signal. The aforementioned predetermined period of time can be varied by using a known timer circuit in accordance with the selected magnification ratio or the predetermined period of time can be set as follows by using the method shown in FIG. 14 which is similar to the method shown in FIG. 4.

Figure 14:
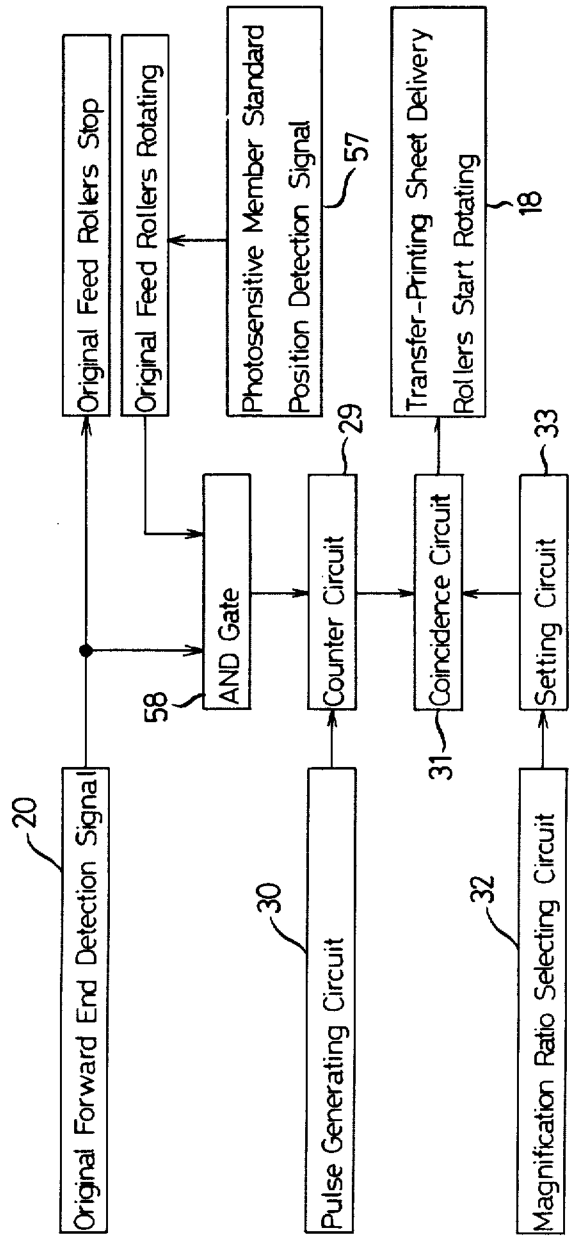
FIG. 14 is a block diagram showing a digital control circuit for changing the predetermined period of time in the case of the third embodiment.

In the block diagram shown in FIG. 14, the detection switch 20 produces a detection signal when it detects the forward end of an original. The detection signal, which stops the sheet original feed rollers *3a* and *3b*, is supplied to an AND gate 58. After lapse of a fixed period of time following the production of a detection signal by a photosensitive member standard position detection switch 57, the sheet original feed rollers *3a* and *3b* start rotating again to cause the original to restart its travel. This restart signal is also supplied to the AND gate 58. When the two signals are supplied to the AND gate 58, a start signal is supplied from the AND gate 58 to the counter circuit 29 to thereby start the circuit 29. The counter circuit 29, to which pulses are supplied by a pulse generating circuit 30 at all times, starts counting the number of pulses when it is actuated. The number of pulses thus counted is supplied to a coincidence circuit 31 to which the number of pulses corresponding to the magnification ratio selected by the magnification ratio selecting circuit 32 and set by a setting circuit 33 has already been supplied. When the number of pulses successively supplied from the counter circuit 29 coincides with the number of pulses already supplied from the setting circuit 33, the coincidence circuit 31 produces a signal which energizes either the register rollers 18, 18 or 27, 27 to deliver a transfer-printing sheet or a photosensitive sheet to the photosensitive drum 11.

When the apparatus shown in FIG. 5 is used, the solenoid 34 is energized by the original restart signal. The rest of the operation is as described with reference to FIG. 5.

Figure 15:
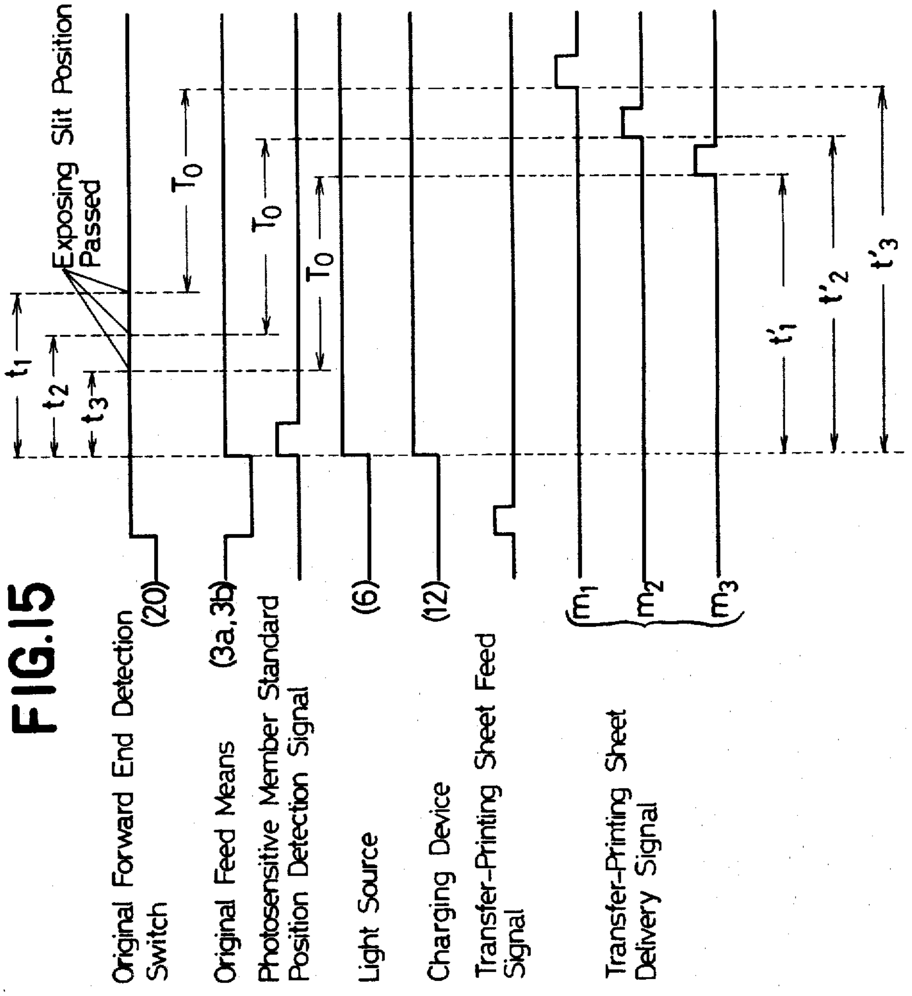
FIG. 15 is a time chart showing the operation of various devices performed in chronological sequence when the third embodiment of the method in conformity with the invention is carried into practice.

FIG. 15 shows another time chart in which the sheet original feed rollers *3a* and *3b* stop rotating and cause the original 5 to temporarily remain stationary as aforementioned when the forward end of the original 5 is detected by the detection switch 20, and at the same time the feed roller 23 is caused to rotate by a transfer-printing sheet feed signal to feed a transfer-printing sheet. The transfer-printing sheet thus fed abuts against the register rollers 18, 18 which are inoperative and stops in a standby position. Then, the detection switch 57 detects the standard position of the photosensitive member 11 and a current is passed to the light source 6 and the charging device 12. The sheet original feed rollers 3a and 3b, which are inoperative, restart rotating and the original starts its travel again.

The fixed interval of time between the passage of the original through the standard position 4a of the exposing slit 4 and the delivery of the transfer-printing sheet is $T_0$ as aforementioned, and the periods of time between the restart of the original and the delivery of the transfer-printing sheet are $t_1'$, $t_2'$ and $t_3'$ as shown in equations (4), (5) and (6) or equations (7), (8) and (9) for the respective magnification ratios.

In the third embodiment described above, one detection means is relied on to effect lighting of the light source, passing of a current to the electrically charging device, and feeding and delivery of a copy sheet in good timing, as in the first embodiment. Thus the same trouble as has been described with reference to the first embodiment may be encountered. In order to obviate this trouble, the second detection switch means for detecting the insertion of an original may be mounted upstream of the original leading end detection switch as is the case with the second embodiment, as a fourth embodiment of the invention, so that an original insertion detection signal produced by the second detection switch means can be used for lighting the light source 6, supplying a current to the electrically charging device 12 and actuating the feed roller 23 of either one of the cassettes 22.

While preferred embodiments of this invention are shown and described hereinabove, it will be understood, of course, that the invention is not to be limited thereto, since many modifications and changes may be made therein, and it is contemplated therefore, by the appended claims, to cover any such modifications as fall within the true spirt and scope of this invention.

What is claimed is:

1. A method for effecting registration for a copying apparatus having a magnification ratio varying device, in which a photosensitive member in motion is exposed to an optical image of an original by slit exposing to form an electrostatic latent image thereon, by varying the original scanning velocity in accordance with the magnification ratio selected; such method comprising the steps of:

providing first detection means detecting the leading end of the original in a path of travel of the original, to produce a first detection signal; providing an other detection means detecting a reference position of the photosensitive member in motion, to produce an other detection signal; temporarily stopping the movement of the original after the lapse of a predetermined time following production of the first detection signal and before exposing the photosensitive member to the original; restarting the travel of the original after the lapse of a predetermined time following the production of said other detection signal; and delivering a transfer-printing sheet after the lapse of a predetermined period of time following the re-starting of the original, with the predetermined period of time being varied to conform with the selected magnification ratio.

2. A method for effecting registration, as claimed in claim 1, further comprising the steps of providing second detection means upstream of the first detection means in the path of travel of the original, to produce a second detection signal; and, response to one of said second detection signal and said other detection signal, performing the operations necessary for effecting electrophotographic copying, including feeding of a copy sheet to the photosensitive member, energization of a light source, charging of an electrical charging device of the copying apparatus, and the other necessary steps.

3. A method for effecting registration for a copying apparatus having a magnification ratio varying device, in which a photosensitive member in motion is exposed to an optical image of an original by slit exposing to form an electrostatic latent image thereon, by varying the original scanning velocity in accordance with the magnification ratio selected; such method comprising the steps of:

providing first detection means detecting the leading end of the original in a path of travel of a movable optical system, to produce a first detection signal;

providing an other detection means detecting a reference position of the photosensitive member in motion, to produce an other detection signal;

temporarily stopping the movement of the optical system of the copying apparatus after the lapse of a predetermined time following production of the first detection signal and before exposing the photosensitive member to the original;

restarting the travel of the optical system of the copying apparatus after the lapse of a predetermined time following the production of said other detection signal; and delivering a transfer-printing sheet after the lapse of a predetermined period of time following the restarting of the optical system of the copying apparatus, with the predetermined period of time being varied to conform with the selected magnification ratio.

4. A method for effecting registration as claimed in claim 3, further comprising the steps of providing second detection means upstream of the first detection means in the path of travel of the movable optical system of the copying apparatus, to produce a second detection signal; and responsive to one of said second detection signal and said other detection signal, performing the operations necessary for effecting electrophotographic copying, including feeding of a copy sheet to the photosensitive member, charging of an electrical charging device for the copying apparatus, and the other necessary steps.

* * * * *